(12) United States Patent
Grebnov et al.

(10) Patent No.: US 9,864,791 B2
(45) Date of Patent: Jan. 9, 2018

(54) FLOW FOR MULTI-MASTER REPLICATION IN DISTRIBUTED STORAGE

(71) Applicant: MICROSOFT TECHNOLOGY LICENSING LLC, Redmond, WA (US)

(72) Inventors: Ilya Grebnov, Bellevue, WA (US); Samuel Banina, Bellevue, WA (US); Charles Lamanna, Bellevue, WA (US); Kevin Lam, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 147 days.

(21) Appl. No.: 14/638,357

(22) Filed: Mar. 4, 2015

(65) Prior Publication Data
US 2016/0179915 A1 Jun. 23, 2016

Related U.S. Application Data

(60) Provisional application No. 62/094,840, filed on Dec. 19, 2014.

(51) Int. Cl.
*G06F 17/30* (2006.01)
*G06F 7/00* (2006.01)

(52) U.S. Cl.
CPC .. *G06F 17/30575* (2013.01); *G06F 17/30339* (2013.01); *G06F 17/30371* (2013.01); *G06F 17/30867* (2013.01)

(58) Field of Classification Search
CPC ......... G06F 17/30867; G06F 17/30339; G06F 17/30371

USPC ........................................................ 707/624
See application file for complete search history.

(56) References Cited

U.S. PATENT DOCUMENTS

| | | | |
|---|---|---|---|
| 5,815,649 | A | 9/1998 | Utter et al. |
| 7,523,110 | B2 | 4/2009 | Holenstein et al. |
| 7,577,661 | B2 | 8/2009 | Bankston et al. |
| 7,716,181 | B2 | 5/2010 | Todd |
| 7,716,525 | B1 | 5/2010 | Buchko et al. |
| 7,788,223 | B2 | 8/2010 | Liu et al. |
| 8,055,861 | B2 | 11/2011 | Todd et al. |
| 8,301,595 | B2 | 10/2012 | Megginson |

(Continued)

OTHER PUBLICATIONS

Urbano—Oracle® Database, Advanced Replication 11g Release 2 (11.2), Feb. 2010, Oracle®.*

(Continued)

*Primary Examiner* — Kuen Lu
(74) *Attorney, Agent, or Firm* — Shook, Hardy & Bacon, L.L.P.

(57) ABSTRACT

Embodiments are directed to replicating data in distributed storage. A replication message may be retrieved from a message queue associated with a source table. The replication message may include a row identifier. One or more target storages within a same replication group as the source table may be identified. A row from each of the one or more target storages may be obtained corresponding to the row identifier. A winning row may be determined from the obtained rows based on a latest timestamp of the row. A replication operation may be created based on the winning row. The replication operation may be performed on the obtained rows from each of the target storages.

20 Claims, 8 Drawing Sheets

(56) References Cited

U.S. PATENT DOCUMENTS

| | | | |
|---|---|---|---|
| 8,468,132 | B1 | 6/2013 | O'Neill et al. |
| 8,719,254 | B2 | 5/2014 | Yang et al. |
| 8,782,004 | B2 | 7/2014 | Ducott, III et al. |
| 8,793,691 | B2 | 7/2014 | Devadhar |
| 2004/0240297 | A1 | 12/2004 | Shimooka et al. |
| 2005/0027718 | A1 | 2/2005 | Sakaguchi et al. |
| 2010/0114824 | A1 | 5/2010 | Krishnaprasad et al. |
| 2011/0161289 | A1 | 6/2011 | Pei et al. |
| 2011/0196833 | A1 | 8/2011 | Drobychev et al. |
| 2011/0196882 | A1* | 8/2011 | Kesselman ....... G06F 17/30575 707/753 |
| 2011/0251996 | A1 | 10/2011 | Sustman et al. |
| 2011/0295929 | A1 | 12/2011 | Sagar et al. |
| 2012/0023066 | A1 | 1/2012 | Bourbonnais et al. |
| 2012/0303581 | A1 | 11/2012 | Calder et al. |
| 2013/0124464 | A1 | 5/2013 | Rank et al. |
| 2013/0339295 | A1 | 12/2013 | Dean et al. |
| 2014/0040206 | A1 | 2/2014 | Ramakrishnan et al. |
| 2014/0207850 | A1 | 7/2014 | Bestler et al. |
| 2014/0279855 | A1* | 9/2014 | Tan .................. G06F 17/30345 707/609 |
| 2015/0066850 | A1 | 3/2015 | Oliver et al. |
| 2015/0142855 | A1* | 5/2015 | Fast ................. G06F 17/30569 707/803 |

OTHER PUBLICATIONS

Urbano—Oracle® Database, Advanced Replication 11 g Release 2 (11.2), Feb. 2010, Oracle®.*

Brunette et al.: "ODK Tables: Building Easily Customizable Information Applications on Android Devices", DEV '13, Jan. 11-12, Bangalore India, hereafter "Brunette".*

"DFSR Overview", Published on: Nov. 5, 2010, 1 page. Available at: "http://msdn.microsoft.com/en-us/library/bb540025(v=vs.85). aspx".

Keating, Brian, "Challenges Involved in Multimaster Replication", Published on: Sep. 14, 2008, 13 pages. Available at: "http://www.dbspecialists.com/files/presentations/mm_replication.html".

"Solving Common Replication Conflicts", Published on: Dec. 11, 2012, 3 pages. Available at: "http://www.dbspecialists.com/files/presentations/mm_replication.html".

"Postgres Plus Advanced Server xDB Replication Server User's Guide", Published on: Mar. 8, 2013, 17 pages. Available at: http://www.enterprisedb.com/docs/en/9.2/repguide/Postgres_Plus_xDB_Replication_Server_Users_Guide-32.htm.

"Oracle Fusion Middleware Deployment Planning Guide for Oracle Directory Server Enterprise Edition", Published on: Dec. 11, 2012, 4 pages. Available at: "https://docs.oracle.com/cd/E19656-01/821-1502/6nmfv3a55/index.html".

"Configuring Conflict Resolution", Published on: Mar. 24, 2012, 63 pages. Available at: "https://docs.oracle.com/cd/B28359_01/server.111/b28327/rarconflictres.htm#i17665".

"Multimaster Replication", Published on: Sep. 19, 2009, 1 page. Available at: "http://technet.microsoft.com/en-us/library/cc959273. aspx".

Hanselman, Scott, "How to run Background Tasks in asp.net", Published on: Aug. 26, 2014, Available at: http://www.hanselman.com/blog/HowToRunBackgroundTasksInASPNET.aspx.

Non-Final Office Action dated Jul. 14, 2017 in U.S. Appl. No. 14/638,202, 13 pages.

Final Office Action dated Nov. 3, 2017 in U.S. Appl. No. 14/638,202, 12 pages.

* cited by examiner

FLOW FOR MULTI-MASTER REPLICATION IN DISTRIBUTED STORAGE

CROSS-REFERENCE TO RELATED APPLICATION

This application claims the benefit of U.S. Provisional Patent Application No. 62/094,840, filed Dec. 19, 2014, entitled "FLOW FOR MULTI-MASTER REPLICATION IN DISTRIBUTED STORAGE" which is incorporated herein by reference in its entirety.

BACKGROUND

Data storage in a distributed computing environment, such as a cloud computing environment, provides the ability to store data over a network. Since the data is distributed over a network (and stored on one or more network servers), a distributed storage system provides marked benefits over conventional storage, such as scalability, durability, and high availability of data. For example, data may be replicated on multiples servers (at different data centers), ensuring that if a server containing the data becomes inaccessible, the data may still be accessed on a different server.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Embodiments described herein are directed to replicating data in distributed storage. A replication message from a message queue associated with a source table may be retrieved. The replication message may include a row identifier. One or more target storages within a same replication group as the source table may be identified. A row from each of the one or more target storages may be obtained corresponding to the row identifier. A winning row may be determined from the obtained rows based on a latest client timestamp of the obtained rows. A replication operation may be created based on the winning row and may be performed on the target storages. When the operation has been successfully performed on the target storages, the replication message may be removed from the message queue.

BRIEF DESCRIPTION OF THE DRAWINGS

Embodiments described herein are described in detail below with reference to the attached drawing figures, wherein.

DETAILED DESCRIPTION

Figure 1:
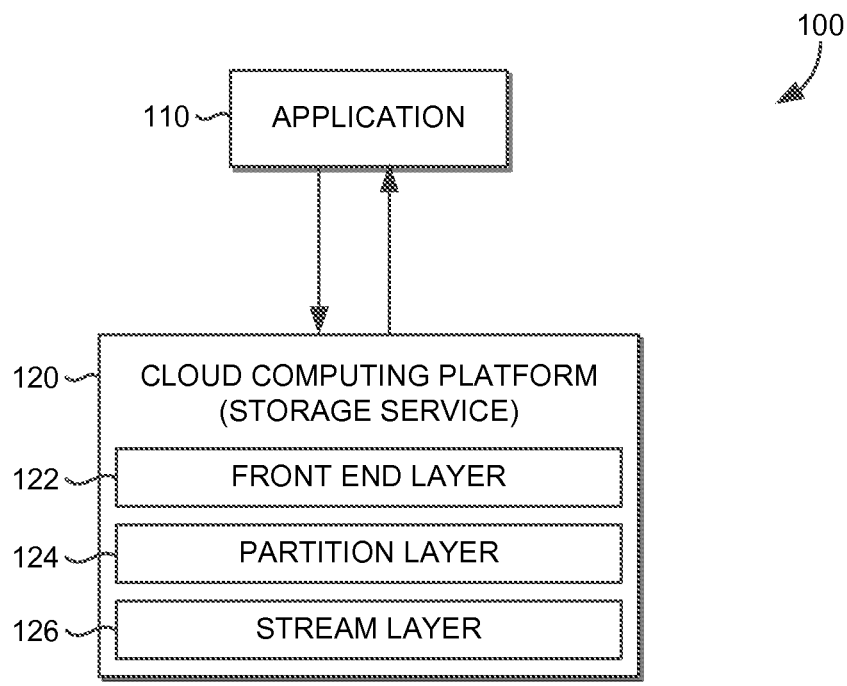
FIG. 1 is a block diagram of an exemplary distributed storage system in which embodiments described herein may be employed.

The subject matter of embodiments described herein is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising." In addition, words such as "a" and "an," unless otherwise indicated to the contrary, include the plural as well as the singular. Thus, for example, the requirement of "a feature" is satisfied where one or more features are present. Also, the term "or" includes the conjunctive, the disjunctive and both (a or b thus includes either a or b, as well as a and b).

Replicating data across multiples servers (at different data centers) in a distributed computing environment ensures that if a data store and/or server storing the data becomes inaccessible, a user may still be able to access the data on a different data store and/or server. For example, a user may want to insert a new record (e.g., a row) into a table. If the table is replicated on multiple data stores, the system may write the record to a first copy of the table (hereinafter also referred to as a "source table") and replicate the changes to the other copies of the table. However, as different copies of the table (i.e., tables on different data stores) are written to, the copies of the table may become out of synch. Furthermore, if different versions of the record are written, it may not be clear which version is the correct version. Thus, synchronizing copies of the table on different data stores presents a variety of challenges. For example, a user may update a row of a table. The system may write the data to a first table. Then the user may update the data further, and the system may write the data to a second table. Without some way to determine which data is correct, stale data (e.g., data that is no longer current) may overwrite the fresh data (e.g., data that is current).

Solutions include writing data to all locations at the same time so that any location can be read for the data (i.e., all table have the same data). However, if one or more data centers is unavailable, all write requests would fail or the tables would become out of sync. Another solution is to always write to one location (e.g., source table) and replicate the data to the other locations in the background. However, if the location to write data to is unavailable, no write operation would be performed.

Embodiments described herein are directed to replicating data in distributed storage. At a high level, the replication system leverages entity tags (eTags) and two-phase deletion within a replication group to ensure replication without loss of data or corruption. The replication system achieves eventual consistency using system components that perform specific operations in a multi-master configuration. The multi-master configuration supports writing original data to any table in the replication group and the original data can be replicated to other tables eventually. A client timestamp can be used to determine whether a new version of the data exists. As such, if a newer version of the data has been written to a different table in the group before the replication message for the original data is processed, then the new version of the data can be replicated across the tables in the replication group and overwrite the older version of the data that spawned the replication message. For example, if a newer version of a row exists in any of the tables, the row with the newer version may be designated the winning row. Thus, when a replication operation is performed, the data from the winning row may be used to overwrite the data in corresponding rows.

Guaranteeing replication of data using the replication system supports writing to multiple locations directly. By way of example, a caller can simultaneously write to several different locations with the write operation comprising a data record directly to each location with the same client timestamp. The write operation can still correspond to a replication operation according to embodiments described herein. In this regard, when the replication message for the data record is processed, a determination is made that the replication message data record is identical to the data record from the original simultaneous write operation, and further action, for a location with the identical data, will not be taken.

If at any point, the replication operation fails, the replication message, to replicate the data on the tables in the replication group, remains in a message queue. The replication message can be iteratively processed, in other words, attempted again later, until the replication is successful and the replication message is dequeued. Further, a replication operation can fail if a row has been updated since the replication message began being processed. This ensures that the new data is not overwritten and simply triggers a message to be attempted later. During the next replication operation, the row with the new data will be identified as the winning row instance.

It is contemplated that when a caller decides to delete a row, the row can be marked for deletion in the table, but not immediately deleted. This limits any conflicts when one row instance in a replication group is marked for deletion, but a different row instance has been updated. The winning operation (e.g., delete or update) can be decided using the client timestamp and replicated across the replication group. As such, a deletion can occur only when it is determined that all instances of a row are marked for deletion.

CAP Theorem

The CAP theorem, or Brewer's theorem, posits that a distributed computing system cannot simultaneously provide consistency, availability, and partition tolerance. Consistency, as defined by the CAP theorem, requires that data stores at nodes (e.g., computing devices, processing units, or blades in a server rack) of a distributed computing system be consistent. For example, if a change is made at one node, all other nodes must also reflect the change. Alternatively, if a node does not reflect the change, no nodes can reflect the change. Availability, as defined by the CAP theorem, requires that a distributed computing system be responsive to all requests, regardless of whether the response is that the request succeeded or failed. If one of the nodes is offline or inaccessible, the distributed computing system may still send a response from at least one of the other nodes. Partition tolerance, as defined by the CAP theorem, requires that a distributed computing system continue to operate despite arbitrary message loss or failure of part of the system. For example, if part of the distributed computing system is offline, the system may still perform operation and otherwise continue to operate.

In accordance with the CAP theorem, at most two of the three (consistency, availability, and partition tolerance) can be achieved in a distributed computing system. Thus, a distributed system can be described as attempting to achieve one of three goals under the CAP theorem: AP (continuously available and partition tolerant but inconsistent), CP (consistent and partition tolerant but unavailable during partitions), and CA (consistent and continuously available but not tolerant of partitions).

Many traditional storage systems attempt to provide CP (consistent and partition tolerance). Thus, tables will be consistent between servers, and the system will be partition tolerant, e.g., a failure of one server does not result in a failure of the entire system. However, CP forgoes availability, e.g., the tables may not be responsive some of the time. Recently, however, some storage system have begun attempting to provide AP (continuously available and partition tolerance), i.e., some distributed storage systems have providing high availability as a goal.

HADR (High Availability Disaster Recovery)

A HADR (High Availability Disaster Recovery) system may replicate tables across servers to ensure that table data is constantly available. High availability (HA) is a measure of a system's ability to remain accessible in the event of a system component failure. Disaster recovery (DR) is a process by which a system is restored to a previous state, e.g., after a natural or man-made disaster. A HADR system should allow a user to access a table located on at least one server if some of the servers become unresponsive or inoperable. However, strategies must be implemented to keep copies of the table synchronized without substantially affecting the availability of the system.

Eventual consistency is a consistency model used to achieve high availability. Eventual consistency ensures that, if no new updates are made to a given table or data row, all tables will eventually become synchronized and accesses to any of the tables will return the same value. Thus, although at some points in time, data may not be consistent among the tables, the data will eventually become synchronized Improvements have been made in reducing the amount of time that data remains unsynchronized in these systems. For example, in some systems, it has been demonstrated that eventually consistency can be achieved on the order of five seconds. Thus, consistency may be sacrificed for the sake of improved availability.

Definitions

The terms "source table" and "target table" or "source storage" and "target storage" as used herein are used to describe the relationship between tables. A source table or storage refers to a table from which replication will occur (e.g., since the table was written to with the original operation), and target table or storage refers to a table to which the replication will take place. When performing a read or write operation to a table, a single table may be used to perform the operation (i.e., the source table). In some aspects, the same table may be used for both operations (e.g., read and write) or different tables may be used for each operation. For example, performing a read operation retrieves a row from a table in one data store, and performing a write operation modified a row of a table from another data store. A table may be a source table for one operation, and a target table for a different operation.

As used herein, the term "replication group" refers to a set of redundant target storages. For example, a table may be replicated across multiple data centers in the replication group ensuring that the table can be accessed from any of the redundant target storages.

As used herein, the term "winning row" refers to row of a table with a latest client timestamp. For example, as tables of a replication group are updated, the tables may become inconsistent, i.e., different data may be saved in corresponding table rows. To determine which row was last updated, a client timestamp of the row (or the update to the row) can be determined and the latest client timestamp would correspond to the winning row. The term "winning row" may refer to the row of the table or the data represented by the row of the table. For example, when a winning row is replicated, an insert operation including the data found in the winning row may be created. It should be understood that replicating a winning row refers to replicating the data of the winning row to a corresponding table.

Exemplary Distributed Storage System

For purposes of a detailed discussion below, embodiments are described with reference to a storage service supported by a cloud computing platform, and further by way of example, a cloud computing platform having a front end layer, partition layer, and stream layer. However, the operations described herein can be performed in different types of operating environments having alternate configurations of the functional components described herein. As such, the embodiments described herein are merely exemplary, and it is contemplated that the techniques may be extended to other implementation contexts.

A distributed storage system can be implemented as a cloud computing platform that runs cloud services across different data center and geographic regions. The cloud computing platform can implement a fabric controller component for provisioning and managing resource allocation, deployment/upgrade, and management of cloud services. Typically, a cloud computing system acts to store data or run service applications in a distributed manner. The service-application components (e.g., tenant infrastructure or tenancy) of the cloud computing system may include nodes (e.g., computing devices, processing units, or blades in a server rack) that are allocated to run one or more portions of a tenant's service applications.

When more than one separate service application is being supported by the nodes, the nodes may be partitioned into virtual machines or physical machines that concurrently run the separate service applications, respectively, in individualized computing environments that support the resources and/or operating system specific to each service application. Further, each service application may be divided into functional portions such that each functional portion is able to run on a separate virtual machine. In cloud computing systems, multiple servers may be used to run service applications and perform data storage operations in a cluster. In particular, the servers may perform data operations independently but exposed as a single device referred to as a cluster. Each server in the cluster may be referred to as a node.

A storage service on the cloud computing platform can be a service supported using the fabric controller component. The storage service can be responsible for managing the replication and data placement across disks and load balancing the data and the application traffic with storage clusters. The storage service can be responsible for managing access to a high volume of storage. The storage service can implement a storage stamp as a cluster of N racks of storage nodes and a location service that manages the storage stamps. Specifically the location service can allocate location stamps and manage them across the storage stamps for disaster recovery and load balancing.

With reference to FIG. 1, the architecture 100 of a storage stamp, in a cloud computing platform 120 supporting a storage service, can include a front-end (FE) layer 122, a partition layer 124, and a stream layer 126 (or distributed file system (DFS) layer). The FE layer 122 may be configured to receive incoming requests from an application 110 or client. Upon receiving a request, the FE layer 122 can authenticate and authorize the request. The FE layer 122 can route the request to a partition server in the partition layer. In embodiments, the FE layer 122 maintains a partition map that keeps track of partition name ranges and which partition server is serving which partition names.

The partition layer 124 is responsible for managing and understanding high level abstractions of user files, structured storages, and messaging. The partition layer 124 also provides a scalable index, transaction ordering, and storing consistency for objects. The partition layer 124 can specifically support storing object data on top of the stream layer 126. In embodiments, the partition layer partitions data objects within a storage stamp.

The stream layer 126 stores bits on disk and supports replicating the data across many servers to keep data durable within a storage stamp. The stream layer 126 supports files called streams which are ordered lists of large storage chunks called extents. The stream layer stores and replicates extents. The data stored in the stream layer is accessible from the partition layer 124. The stream layer 126 may provide a file system namespace and an Application Programming Interface (API) for the partition layer 124 to perform writes. Writes can be append-only. The interface between the stream layer 126 and partition layer 124 allows a client to open, close, delete, rename, append to, and concatenate streams. A stream can refer to an ordered list of extent points, where an extent is a sequence of append blocks. An extent can be a seal extent, such that, the extent can no longer be appended to. An application can read data from extents to access block contents of the extents.

The stream layer 126 can include a stream manager (not shown) and extent node (not shown). The stream manager is responsible for tracking the stream namespace, what extents are in each stream and the extent allocation across extent nodes. The stream manager performs lazy re-replication of extent replicas that are lost due to hardware failures or unavailability. Each extent node maintains the storage for a set of replicas assigned to the corresponding extent by the stream manager. Each extent node contains a view about the extents it owns and where the peer replicas are for a given extent.

A discussion of a suitable architecture of a distributed storage system for performing embodiments described herein is further described in described in U.S. Pat. No. 8,620,884, filed Oct. 24, 2008, and entitled "SCALABLE BLOB STORAGE INTEGRATED WITH SCALABLE STRUCTURED STORAGE," and Calder, Brad et al., "Windows Azure Storage, A Highly Available Cloud Storage Service with Strong Consistency" *SOSP '11 Proceedings of the Twenty-Third ACM Symposium on Operating Systems Principles,* 2011: Pages 143-157. Print, which both are incorporated herein, by reference, in their entirety.

Figure 2:
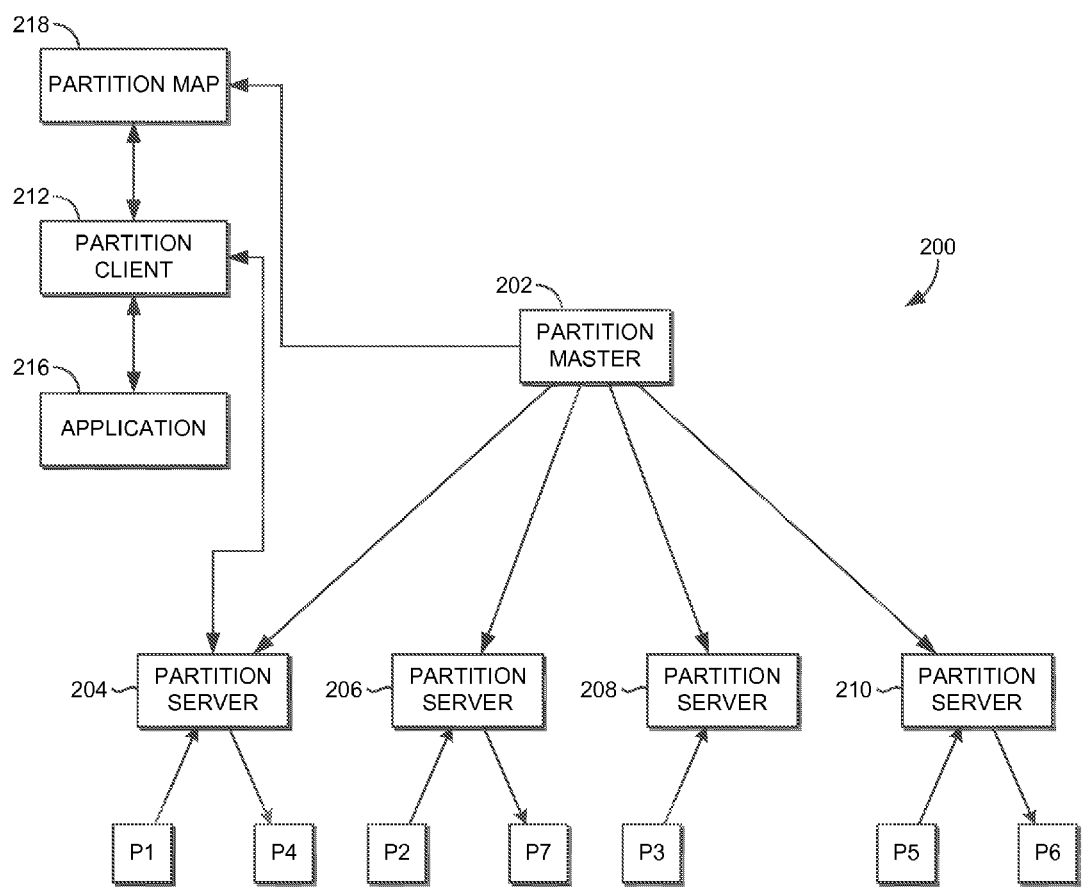
FIG. 2 is a block diagram of an exemplary distributed storage system in which embodiments described herein may be employed.

Referring now to FIG. 2, FIG. 2 illustrates an exemplary distributed storage system in which implementations of the present disclosure may be employed. In particular, FIG. 2 shows a high level architecture of cloud computing system 200 in accordance with implementations of the present disclosure. It should be understood that this and other arrangements described herein are set forth only as examples. Other arrangements and elements (e.g., machines, interfaces, functions, orders, groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Among other components not shown, cloud computing system 200 may include master 202 (e.g. partition master 202), servers 204, 206, 208, and 210 (e.g. partition servers 204, 206, 208, and 210), and client 212 (e.g. partition client 212). Each may reside on any type of computing device. The components of cloud computing system 200 may communicate with each other over a network, which may include, without limitation, one or more local area networks (LANs) and/or wide area networks (WANs). Although a single master, four servers, and a single client are shown in FIG. 2, any number of masters, servers, and clients may be employed within cloud computing system 200 within the scope of implementations of the present disclosure.

Stored data of cloud computing system 200 is divided amongst a plurality of partitions. For example, cloud computing system 200 can comprise a key space divided amongst the plurality of partitions. Master 202 is configured to assign the partitions to servers 204, 206, 208, and 210, and/or other servers of cloud computing system 200 not shown. Master 202 can also be configured to determine when a partition of the partitions is not hosted by any server due to a failure and reassign the partition to a different server. Master 202 is further configured to control load balancing of the partitions on servers 204, 206, 208, 210, and/or other servers of cloud computing system 200 not shown. Additionally, Master 202 is configured to monitor resource utilization with respect to any of the partitions and/or servers 204, 206, 208, and 210, and/or other servers of cloud computing system 200 not shown. It is further contemplated that master 202 is configured to support integrated resource allocation and load balancing in accordance with embodiments of the present invention, as discussed in more detail below.

In cloud computing system 200, the servers, such as servers 204, 206, 208, and 210 are utilized to store and provide access to a storage system. Master 202 is configured to manage the servers. Furthermore, client 212 is configured to provide applications, such as application 216, access to the storage system. Each server of cloud computing system 200, such as servers 204, 206, 208, and 210, can be responsible for providing read and write access to zero to many partitions assigned to the server. Furthermore, each of the partitions can be assigned to a single one of the servers. In the example shown in FIG. 2, server 204 is hosting partitions P1 and P4, server 206 is hosting partitions P2 and P7, server 208 is hosting partition P3, and server 210 is hosting partitions P5 and P6.

Client 212 may be linked into an application, such as application 216. In some implementations, client 212 is configured to issue commands to some of the partitions (e.g. partitions P1, P2, P3, P4, P5, P6, and P7) hosted by servers 204, 206, 208, and 210 and/or other servers of cloud computing system 200. Also in some implementations, client 212 may communicate with the application indirectly, for example, through a virtual IP and software load balancer or other means that directs communication requests to a front-end. The front-end can utilize a partition map, such as partition map 218, to determine which of the servers is hosting (mapped to) which of the partitions and can send commands to those servers. Results of the commands can be received back from the servers and can be passed to the application. The partition map stores mappings between the partitions and the servers they are assigned to, and can typically be maintained by a master, such as master 202.

Having described various aspects of cloud computing system 200, it is noted that any number of components may be employed to achieve the desired functionality within the scope of the present disclosure. Although the various components of FIG. 2 are shown with lines for the sake of clarity, in reality, delineating various components is not so clear, and metaphorically, the lines may more accurately be grey or fuzzy. Further, although some components of FIG. 2 are depicted as single components, the depictions are exemplary in nature and in number and are not to be construed as limiting for all implementations of the present disclosure.

It should be understood that this and other arrangements described herein are set forth only as examples. Other arrangements and elements (e.g., machines, interfaces, functions, orders, and/or groupings of functions) can be used in addition to, or instead of, those shown, and some elements may be omitted all together. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions, including the functions described below with respect to the table storage 300, may be carried out by a processor executing instructions stored in memory.

Exemplary Table Storage

Figure 3:
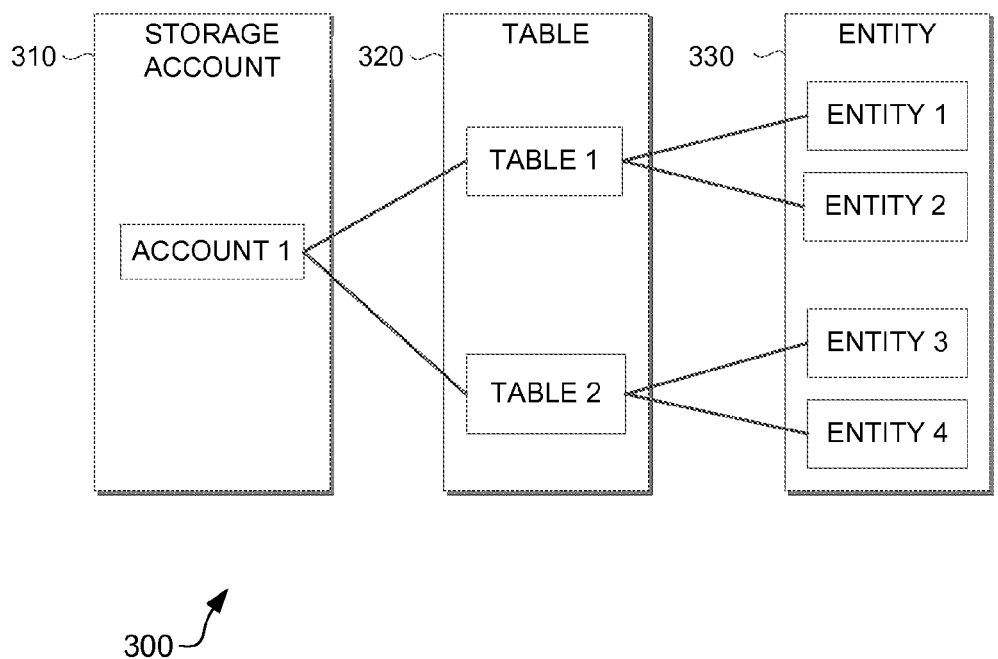
FIG. 3 is a block diagram of an exemplary data model for table storage, in accordance with embodiments described herein.

FIG. 3 illustrates an exemplary data model for table storage, in accordance with embodiments described herein. Table storage 300 may be comprised of storage accounts 310, tables, 320, and entities 330. Access to table storage 300 may be done through storage account 310. A storage account may have one or more tables 320, and table 320 may have one or more entities 330. Entity 330 is the base data item stored in table 320. Each entity may have an identifier and timestamp. The table storage may be part of stream layer 136, as described in FIG. 1.

Data in the table may be replicated across multiple servers. For example, the data may be spread out over multiple storage nodes. Since the underlying replication layer is a distributed file system, the replicated data may be accessible from all of the partition servers as well as from other DFS servers. Stream layer 136, as described in FIG. 1, stores the data in extents. Each extent may be replicated multiple times.

For a given extent, stream layer 136 has a primary server and multiple secondary servers. All writes can go through the primary server, which then sends replication requests to the secondary servers. Success may returned back from the primary server to the client once the data is written to at least one DFS servers. If one of the DFS servers is unreachable when performing the write, the DFS layer may choose more servers to write the data to so that (a) all data updates are written before returning success to the client and (b) writes can make forward progress in the face of a DFS server being unreachable. Reads can be processed from any up-to-date extent replica (primary or secondary), so reads can be successfully processed from the extent replicas on secondary DFS servers.

Multiple replicas are kept for each data item, so if one fault domain goes down (i.e., a data store is unreachable), there will be other data stores to access the data from, and the system will dynamically re-replicate the data to bring it back to a healthy number of replicas.

Exemplary Table Replication Architecture

Figure 4:
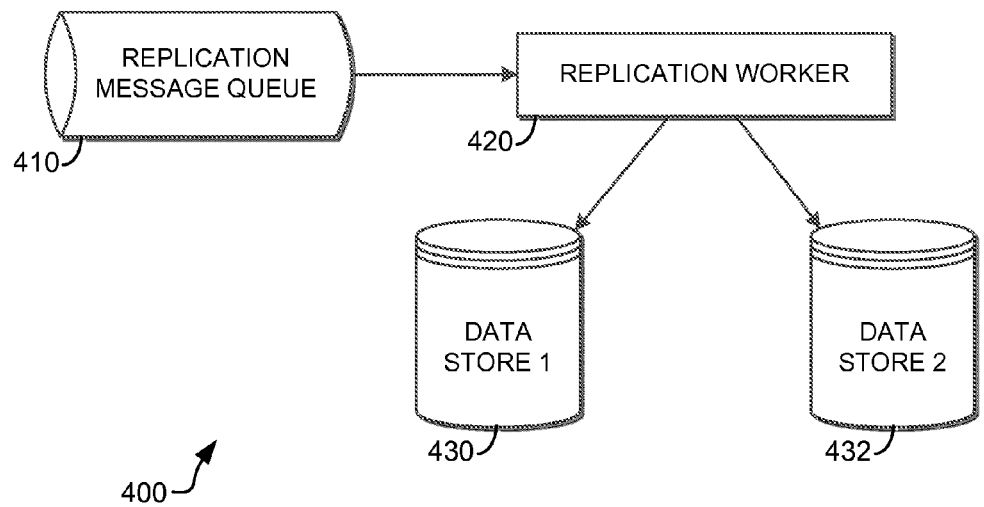
FIG. 4 is a diagram of an exemplary table replication architecture suitable for delivering replication messages, in accordance with embodiments described herein.

Turning now to FIG. 4, an exemplary table replication architecture 400 is depicted in accordance with at least one aspect of the present invention.

The table replication architecture 400 includes replication message queue 410, replication worker 420, and two or more data stores 430, 432. Replication message queue 410 may receive and store replication messages. Replication message queue 410 can use a First-In-First-Out (FIFO) data structure, where new messages are pushed to the top of the queue and older messages are popped from the bottom of the queue. Replication message queue 410 is not limited to a FIFO data structure, and can employ a different data structure, such as using an ordering method to order the messages in the queue, within the scope of implementations of the present disclosure.

Replication worker 420 may retrieve replication messages from replication message queue 410. Replication worker 420 performs replication operations on data stores 430, 432 in that replication worker 420 communicates data identified in the replication message to ensure consistency in the data between the original source of the data and data stores 430, 432. Data is replicated to multiple data stores to ensure that the data is highly available and can be recovered in the case of a disaster. For example, a replication message may be received by replication message queue 410. When replication worker 420 is able to process the request, replication worker 420 retrieves the replication message. The replication message may indicate that rows of tables in data stores 430, 432 need to be replicated. Thus, replication worker 420 would process the replication message (e.g., perform replication on data stores 430 and 432). Replication worker 420 can continue to process the replication message until the replication is successful.

In the previous example, replication worker 430 performs the replication. However, it should be appreciated that replication worker 430 may process the message in replication message queue 410 and direct another component to perform the actual replication. Furthermore, the previous example shows one replication message queue 410 and one replication worker 420. However, it should be appreciated that there need not be a one-to-one relationship between replication message queue 410 and replication worker 420, and there may be a many-to-one or one-to-many relationship between the replication message queue 410 and replication worker 420. Specifically, by having more than one replication worker 420, replication operations can be performed faster, e.g., since each replication worker 420 can perform a different replication operation from replication message queue 410.

In some examples, replication worker 420 may be unable to replication to all data stores (e.g., one or more data stores may be unavailable). Replication worker 420 may attempt to replicate the data to the data store that are available, i.e., make as many redundant copies of the data as possible. Then, when the unavailable data stores become available, the replication worker 420 may attempt to replicate the data to the data stores. In some examples, replication message queue 410 may retain the replication message until all data stores are written. It should be understood, that replication worker 420 and replication message queue 410 need not take any action to replicate to unavailable data stores, and replicating to the unavailable data stores may be performed by another process or another replication message in replication message queue 410.

Exemplary Method for Replicating Data Across Servers

Figure 5:
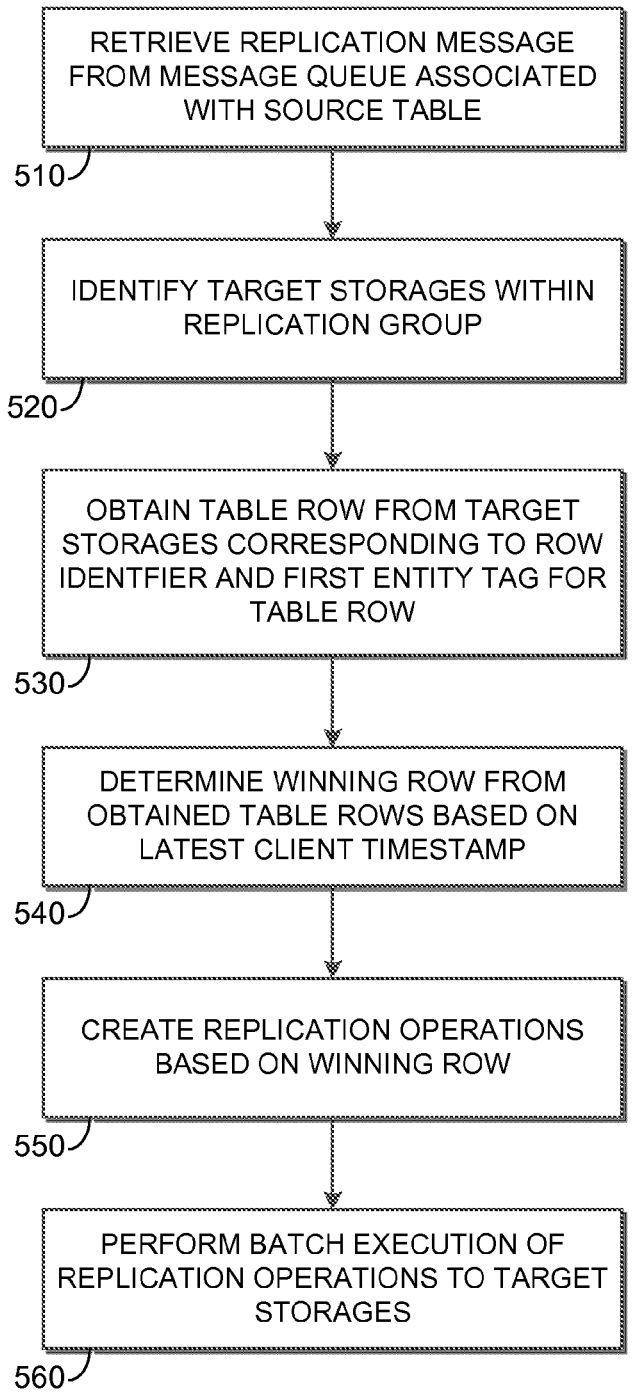
FIG. 5 is a flowchart showing a method of replicating data across servers, in accordance with embodiments described herein.

Turning now to FIG. 5, a method 500 for replicating data in distributed storage is shown, in accordance with embodiments described herein. Method 500 may be performed on a one or more servers in a data center or across multiple data centers.

At step 510, a replication message may be retrieved from a message queue associated with a source table. The replication message may contain at least one row identifier. The replication message is not limited to a row identifier, and may also contain other information. For example, a replication message may contain a username and source table identifier. Furthermore, a replication message need not contain a row identifier, and may contain other data indicating which rows of the target storages should be replicated. The source table may be one of a plurality of source tables in a replication group. The replication message may include instructions to replicate data to one or more table rows of the source tables in the replication group. The instructions may include unique row identifiers for each table row.

At step 520, one or more target storages within the replication group is identified. For example, target storages within the replication group may be replicates or backups of the source table. The target storages include tables within the replication group.

At step 530, a table row corresponding to the row identifier and a first entity tag (eTag) for the table row from each of the one or more target storages is obtained. An eTag is an identifier for a specific version of a resource. For example, whether a matching row corresponding to the row identifier exists in a target storage can be determined If a matching row exists in the target storage, the matching row and the first eTag corresponding to the matching row can be returned. An eTag represents the state of a row at the time the eTag was generated, i.e., an eTag comprises an identifier for a specific version of the table row. If the row is subsequently changed, the eTag will be changed. For example, an eTag will be updated when the row has been written to. The eTag may, e.g., increment the version of the data. Thus, if a first eTag and a subsequent eTag differ (e.g., different versions), the row is determined to have been changed. If a matching row does not exist in the target storage, a placeholder empty row instance may be returned instead. Further a first eTag corresponding to the placeholder empty row instance may also be returned. Although in this example, a placeholder empty row instance is returned, a placeholder row need not be used. For example, an embodiment can return a null value, and the system can recognize that the row does not exist and a new row should be inserted when the replication operation is performed. The first eTag may include an identifier for a specific version of the table row.

At step 540, a winning row is determined from the obtained rows based on a latest client timestamp of the obtained rows. The winning row may be a table row with a latest version (i.e., latest client timestamp) of the table row. For example, a row may contain metadata indicated when the row was last modified. The client timestamps for the obtained rows may be compared and the obtained row with a latest client timestamp can be returned. In the case of a tie (e.g., two rows have the same client timestamp), a table storage timestamp may further be used. If the rows are identical (e.g., the rows share the same client timestamps), the replication worker may determine that the rows are identical and take no further action. Alternatively, the system may select one row of the obtained rows with the latest client timestamp and designate that row as the winning row.

At step 550, replication operations are created based on the winning row. In some embodiments, if the winning row is marked for deletion, a replication operation to delete a row from at least one of the one or more target storages may be created. A row may be marked for deletion instead of deleting the row immediately in order to resolve race conditions. For example, if one row instance is marked for deletion, but a different instance has been updated, the system may not know which row is the current row. Thus, the timestamp would be used to determine which of the deletion and update should be replicated across the replication group. If the row had been deleted from the table, the row would no longer exist and no timestamp would exist, making the updated instance the current row (whether or not the row was correct). When a replication worker determines that all instances of the row in the replication group have been marked for deletion, the row may be actually deleted from all of the tables.

If the winning row exists in a one of the table storages, a replication operation can be created to replicate the winning row across the replication group. For example, if an existing row instance of the one or more table stores differs from the winning row, a replication operation can be created to replace the existing row instance of the one or more table stores with the winning row. If the obtained row is a placeholder empty row instance, a replication operation can be created to insert the winning row to the target storage with the placeholder empty row instance. Alternatively, if a row does not exist in the target storage (e.g., an empty row instance), a replication operation to replace the placeholder empty row instance with the winning row may be created.

In an example, an obtained row may have been modified before a replication operation was performed, but after a winning row has been determined. For example, an obtained row of a table in the replication group may be changed after a winning row was determined. Thus, for all obtained rows, a second eTag may be obtained, where the second eTag represents the state of the obtained row at the time the second eTag was generated. For example, the second eTag may indicate a subsequent version of the data of the row. The first eTag may be compared with the second eTag of the obtained row. For example, the storage layer may determine whether the eTags have changed. If the eTags differs, this indicates that the row has been changed sometime after the first eTag was obtained. Since the eTags differ, the storage operation returns an error and the row is not updated. The replication worker may stop processing the replication operations and the replication massage may remain in the message queue. After a delay, the replication message is fetched from the message queue by a replication worker and the replications operations are performed. The winning row can be replaced by this new winning row (i.e., the row where the first and second eTags differ), and the new winning row can be used for the replication operation. The new winning row represents the most recent updates to the table row, i.e., a latest version of the row. At least one replication operation may be created using the new winning row. This process can be repeated until all of the tables in the replication group are the same. In some examples, when the replication operation is a replace operation, the row may be replaced while the existing eTag is preserved. The replication worker sends back the row to its originating table with its eTag preserved, while its content match the winning row's content. The storage layer then ensures that the incoming eTag (i.e., second eTag) matches the existing one (i.e., first eTag). When the storage layer accepts an update to a row, it will generate a new eTag which will be visible the next time the replication worker fetches the row. If the replication results in an insert to the storage layer, no eTag is required because the storage layer guarantees that an insertion will fail if the row already exists.

At step 560, batch execution of the replication operations is performed to the one or more target storages. A success indicator may be returned when all of the obtained rows of the target storages have been successfully updated. If at any point the storage operation fails or the process cannot be completed, i.e., at least one operation of the replication operations is unsuccessful, the replication operation can be retained in the message queue to be attempted at a later time or the message may be requeued. Once the replication operation is performed at the target storages within the replication group, the replication message may be dequeued from the message queue.

In some embodiments, more than one row identifier may be obtained. Thus, for each unique row identifier, the corresponding rows of the tables of the replication group may be retrieved, and the replication operation may be performed for each winning row corresponding to a unique row identifier. The operations may be performed per row identifier, i.e., the rows may be grouped by row identifier, and the operation may be performed for that row identifier group.

Figure 6:
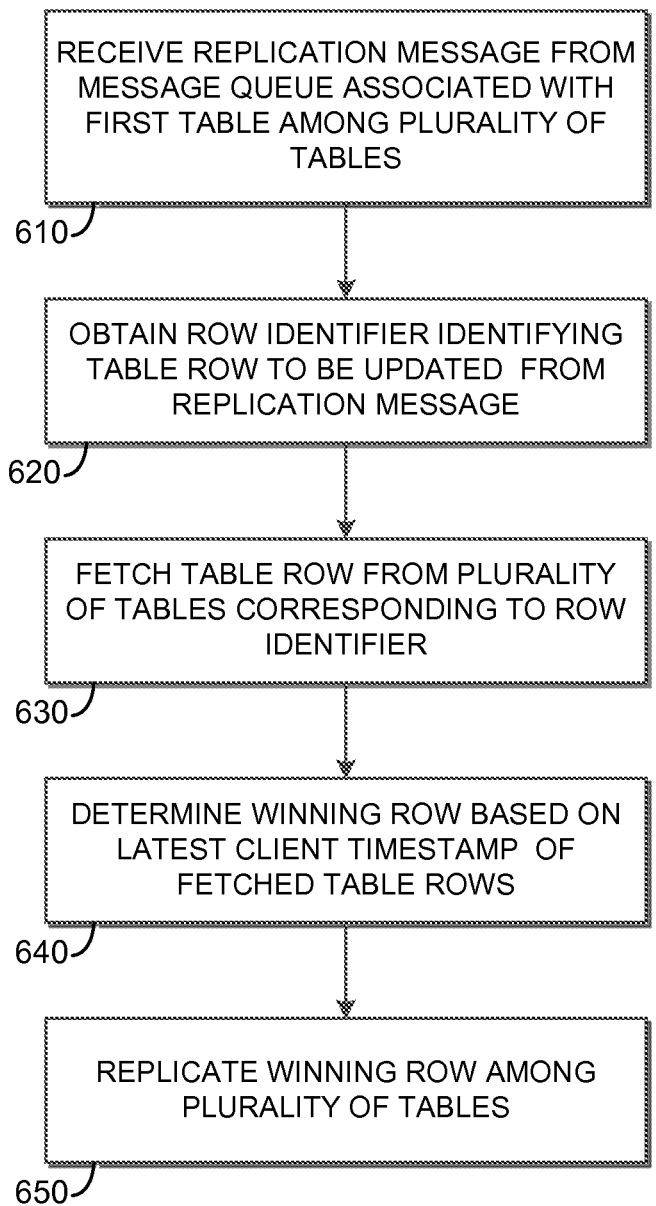
FIG. 6 is a flowchart showing a method of replicating data across servers, in accordance with embodiments described herein.

Turning now to FIG. 6, a method 600 for processing replication messages in distributed storage is shown, in accordance with embodiments described herein. Method 600 may be performed on a one or more servers in a data center or across multiple data centers.

At step 610, a replication message may be retrieved from a message queue associated with a first table among a plurality of tables. At least two of the tables may be located at different locations. The replication message may contain at least one row identifier.

At step 620, at least one row identifier identifying the table row to be updated may be obtained from the replication message.

At step 630, at least one table row from each of the plurality of tables may be fetched corresponding to the row identifier. Whether a matching row corresponding to the row identifier exists in the table or not can be determined For example, if a table does not have a row matching the row identifier, this may indicate that the table was not inserted or was previously removed. If a matching row exists in the table, the matching row can be returned. If a matching row does not exist in the table, a placeholder row can be returned. A first eTag may also be fetched for the at least one row of the plurality of tables.

At step 640, a winning row may be determined based on a latest update timestamp of the fetched tables rows from the plurality of tables. For example, each row may contain metadata indicating when the row was last updated. The latest update timestamps can be compared and the obtained row with a latest timestamp may be returned as the winning row.

At step 650, the winning row may be replicated among the plurality of tables. For example, if a table contains an empty row instance for the row identifier, an insert operation corresponding to the empty row instance can be created. If the winning row is marked for deletion, a delete operation can be created for the row for each of the plurality of tables. A replace operation can be created with the winning row for the row for each of the plurality of tables. For example, if the row is not the winning row (the data or timestamp is different for the row of the table, or the row is a placeholder row), a replace operation can be used to replace the contents of that row.

Meanwhile a second eTag may be obtained for each of the obtained rows. The first eTag may be compared with the second eTag and if the first eTag and second eTag differ, the replication operations may be halted and the replication message may remain in the message queue. After a delay, the replication message may be retrieved by a replication worker. A new winning row may be determined and the new winning row may be replicated among the distribution group.

When the replication is successful for all of the rows, the replication message can be removed from the message queue. However, if the replication is not successful, the message can remain in the queue until all of the replications are successful (e.g., the message can remain in the queue to be retried later).

Figure 7:
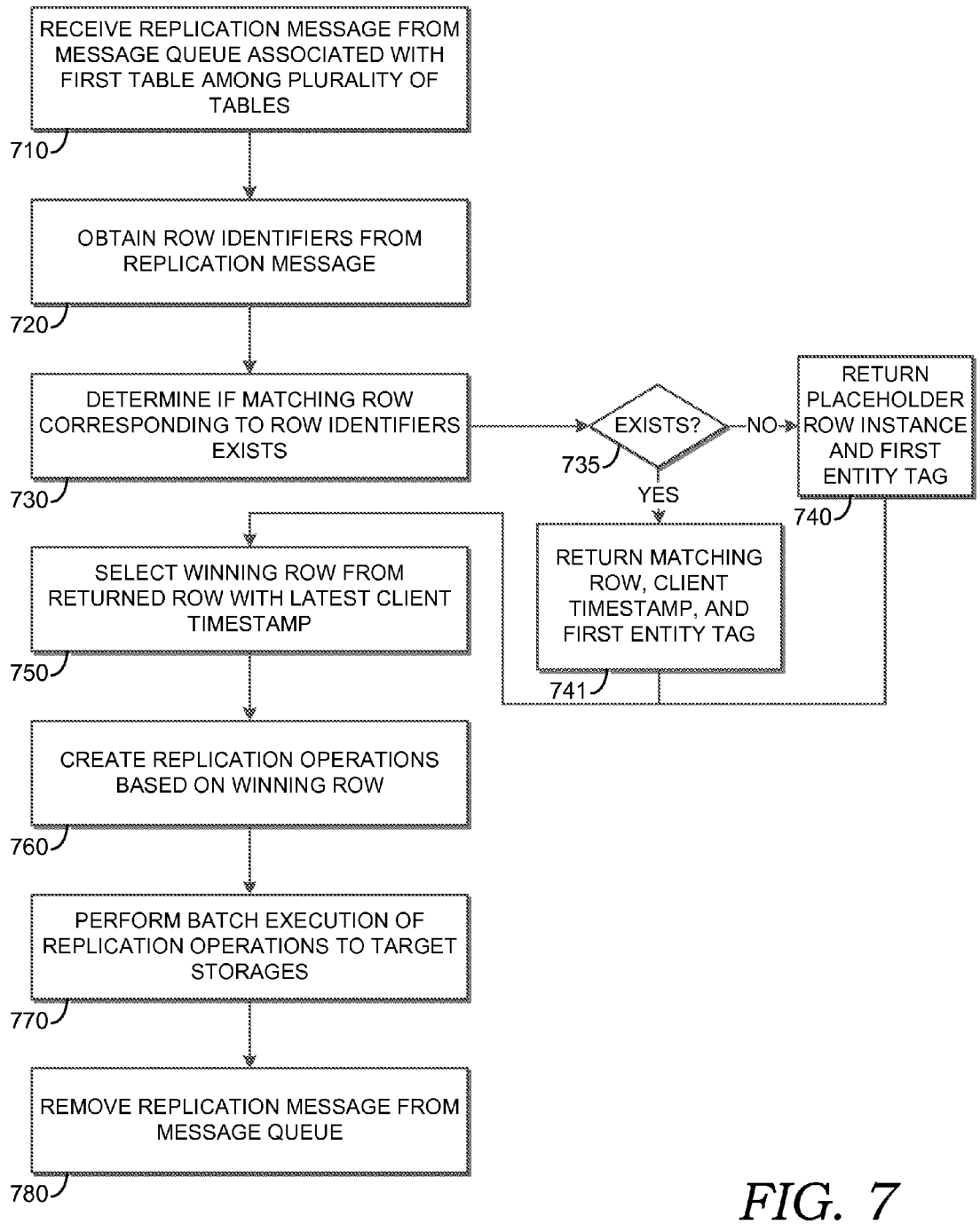
FIG. 7 is a flowchart showing a method of replicating data across servers, in accordance with embodiments described herein.

Turning now to FIG. 7, a method 700 for processing replication messages in distributed storage is shown, in accordance with embodiments described herein. Method 700 may be performed on a one or more servers in a data center or across multiple data centers.

At step 710, a replication message may be received from a message queue associated with a first table among a plurality of tables, at least two tables of the plurality of tables being located at different locations.

At step 720, row identifiers may be obtained from the replication message.

At step 730, whether a matching row corresponding to the row identifiers exists in each of the plurality of tables may be determined If a matching row exists in a table of the plurality of tables (step 735), the matching row and a client timestamp and first entity tag (eTag) corresponding to the matching row may be returned (step 741). If a matching row does not exist in a table of the plurality of tables, a placeholder row instance and first eTag corresponding to the placeholder row instance may be returned (step 740). Each table of the plurality of tables may return a matching row. If no matching row exists, a table may return a placeholder row. Alternatively, the replication worker may determine that a row does not exist and create an empty placeholder row instance for the table where a matching row does not exist. Furthermore, each table may return a timestamp and eTag for the returned row. For example, where a matching row exists, the table may return a timestamp indicating when the row was last updated and an eTag indicating a current version of the row. Where a matching row does not exist, a table may still return a timestamp and eTag, where the timestamp and eTag indicate that the row is an empty row instance.

At step 750, a winning row may be selected from the returned rows with a latest client timestamp.

At step 760, replication operations may be created based on the winning row.

At step 770, batch execution of the replication operations is performed to the target storages. For example, a replication operation to insert a row may be created. A table may replicate the winning row by inserting the winning row into the table. Alternatively, the table may update an existing row of the table with the data from the winning row. If the replication operation is a delete operation, replicating the winning row may include marking an existing row of the table for deletion. Thus, when cleanup is performed, the rows marked for deletion may be deleted from the table (e.g., two-phase replication/cleanup).

At step 770, the replication message may be removed from the message queue.

This configuration ensures that the tables in a replication group will be updated and ensures that the data in the table will eventually be consistent across all of the tables.

Exemplary Operating Environment

Figure 8:
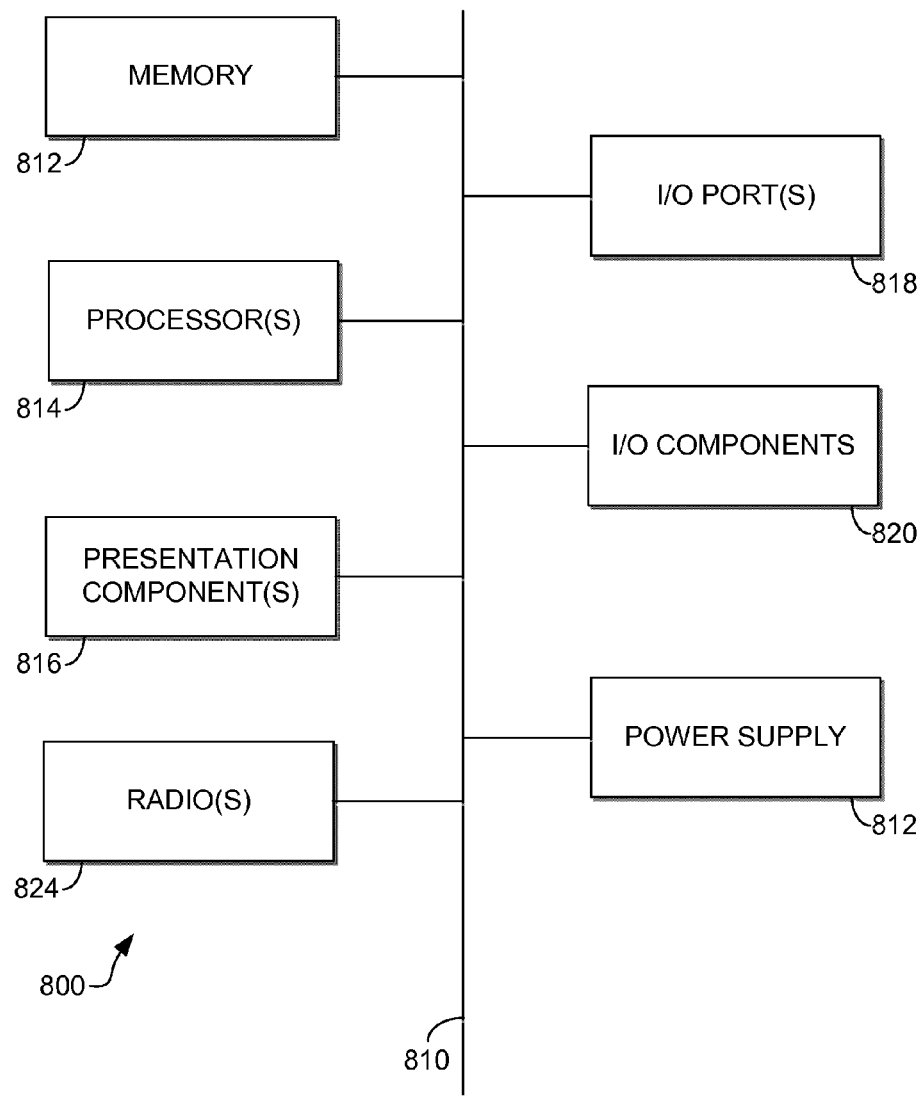
FIG. 8 is a block diagram of an exemplary computing environment suitable for implementing embodiments described herein.

Referring to the drawings in general, and initially to FIG. 8 in particular, an exemplary operating environment for implementing embodiments described herein is shown and designated generally as computing device 800. Computing device 800 is but one example of a suitable computing environment and is not intended to suggest any limitation as to the scope of use or functionality of the embodiments described herein. Neither should the computing device 800 be interpreted as having any dependency or requirement relating to any one or combination of components illustrated.

The embodiments described herein may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Embodiments described herein may be practiced in a variety of system configurations, including handheld devices, consumer electronics, general-purpose computers, specialty computing devices, etc. Embodiments described herein may also be practiced in distributed computing environments where tasks are performed by remote-processing devices that are linked through a communications network.

With continued reference to FIG. 8, computing device 800 includes a bus 810 that directly or indirectly couples the following devices: memory 812, one or more processors 814, one or more presentation components 816, input/output (I/O) ports 818, I/O components 820, and an illustrative power supply 822. Bus 810 represents what may be one or more busses (such as an address bus, data bus, or combination thereof). Although the various blocks of FIG. 8 are shown with lines for the sake of clarity, in reality, delineating various components is not so clear, and metaphorically, the lines would more accurately be grey and fuzzy. For example, one may consider a presentation component such as a display device to be an I/O component 820. Also, processors have memory. The inventors hereof recognize that such is the nature of the art, and reiterate that the diagram of FIG. 8 is merely illustrative of an exemplary computing device that can be used in connection with one or more embodiments described herein. Distinction is not made between such categories as "workstation," "server," "laptop," "handheld device," etc., as all are contemplated within the scope of FIG. 8 and refer to "computer" or "computing device."

Computing device 800 typically includes a variety of computer-readable media. Computer-readable media can be any available media that can be accessed by computing device 800 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 812 includes computer-storage media in the form of volatile and/or nonvolatile memory. The memory 812 may be removable, nonremovable, or a combination thereof. Exemplary memory includes solid-state memory, hard drives, optical-disc drives, etc. Computing device 800 includes one or more processors 814 that read data from various entities such as bus 810, memory 812 or I/O components 820. Presentation component(s) 816 present data indications to a user or other device. Exemplary presentation components 816 include a display device, speaker, printing component, vibrating component, etc. I/O ports 818 allow computing device 800 to be logically coupled to other devices including I/O components 820, some of which may be built in.

Illustrative I/O components include a microphone, joystick, game pad, satellite dish, scanner, printer, display device, wireless device, a controller (such as a stylus, a keyboard and a mouse), a natural user interface (NUI), and the like. In embodiments, a pen digitizer (not shown) and accompanying input instrument (also not shown but which may include, by way of example only, a pen or a stylus) are provided in order to digitally capture freehand user input. The connection between the pen digitizer and processor(s) 814 may be direct or via a coupling utilizing a serial port, parallel port, and/or other interface and/or system bus known in the art. Furthermore, the digitizer input component may be a component separated from an output component such as a display device or, in some embodiments, the usable input area of a digitizer may be co-extensive with the display area of a display device, integrated with the display device, or may exist as a separate device overlaying or otherwise appended to a display device. Any and all such variations, and any combination thereof, are contemplated to be within the scope of embodiments described herein.

A NUI processes air gestures, voice, or other physiological inputs generated by a user. Appropriate NUI inputs may be interpreted as ink strokes for presentation in association with the computing device 800. These requests may be transmitted to the appropriate network element for further processing. A NUI implements any combination of speech recognition, touch and stylus recognition, facial recognition, biometric recognition, gesture recognition both on screen and adjacent to the screen, air gestures, head and eye tracking, and touch recognition associated with displays on the computing device 800. The computing device 800 may be equipped with depth cameras, such as, stereoscopic camera systems, infrared camera systems, RGB camera systems, and combinations of these for gesture detection and recognition. Additionally, the computing device 800 may be equipped with accelerometers or gyroscopes that enable detection of motion. The output of the accelerometers or gyroscopes may be provided to the display of the computing device 800 to render immersive augmented reality or virtual reality.

A computing device may include a radio. The radio transmits and receives radio communications. The computing device may be a wireless terminal adapted to received communications and media over various wireless networks. Computing device 800 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include a Wi-Fi® connection to a device (e.g., mobile hotspot) that provides access to a wireless communications network, such as a WLAN connection using the 802.11 protocol. A Bluetooth connection to another computing device is second example of a short-range connection. A long-range connection may include a connection using one or more of CDMA, GPRS, GSM, TDMA, and 802.16 protocols.

Accordingly, embodiments described herein may be described in the general context of computer-executable instructions, such as program modules, being executed by a computer. Generally, program modules include routines, programs, objects, components, data structures, etc., that perform particular tasks or implement particular abstract data types. The embodiments may also be practiced in distributed computing environments or cloud environments where tasks are performed by remote-processing devices that are linked through a communications network. In a distributed computing environment, program modules may be located in both local and remote computer storage media including memory storage devices.

Embodiments described herein have been described in relation to particular embodiments, which are intended in all respects to be illustrative rather than restrictive. Alternative embodiments will become apparent to those of ordinary skill in the art to which embodiments described herein pertain without departing from its scope.

Embodiments described herein have been described to be illustrative rather than restrictive. It will be understood that certain features and subcombinations are of utility and may be employed without reference to other features and subcombinations. This is contemplated by and is within the scope of the claims.

We claim:

1. One or more computer-storage media storing computer-executable instructions that, when executed by a computing device having a processor, cause the computing device to perform a method of replicating data in distributed storage, the method comprising:
retrieving a replication message from a message queue associated with a source table, the source table being one of a plurality of source tables in a replication group, the replication message comprising a row identifier;
identifying one or more target storages within the replication group, the target storages including tables within the replication group;
obtaining a table row corresponding to the row identifier and a first entity tag (eTag) for the table row from each of the one or more target storages, wherein an eTag comprises an identifier for a specific version of the table row, and wherein the obtaining comprises for each target storage:
determining if a matching row corresponding to the row identifier exists in the target storage; and
when a matching row exists in the target storage, returning the matching row and the first entity tag (eTag) corresponding to the matching row;
determining whether at least one of the obtained rows has a later client timestamp than the table row corresponding to the row identifier from the source table;
determining a winning row from the obtained rows based on a latest client timestamp of the obtained rows, the winning row being a table row with a latest version of the table row;
creating replication operations based on the winning row, wherein a replication operation comprises instructions on inserting data from the winning row in to one or more target storages; and
performing batch execution of the replication operations to the one or more target storages.

2. The media of claim 1, wherein the obtaining comprises:
when the matching row does not exist, returning a placeholder empty row instance and the first eTag corresponding to the placeholder empty row instance.

3. The media of claim 1, wherein the determining a winning row from the obtained rows based on a latest client timestamp of the obtained row comprises:
obtaining a client timestamp indicating a last operation date of an obtained row from the obtained rows of the one or more target storages; and
returning the obtained row with a latest client timestamp.

4. The media of claim 1, the method further comprising:
determining that at least one obtained row contains a placeholder empty row instance, wherein when the at least one obtained row contains a placeholder empty row instance, the creating replication operations comprises creating a replication operation to insert the winning row to the target storage with the placeholder empty row instance.

5. The media of claim 1, wherein the creating replication operations comprises creating a replication operation to replace an existing row instance of the one or more table stores with the winning row.

6. The media of claim 1, the method further comprising:
determining that the winning row is marked for deletion, wherein when the winning row is marked for deletion, the creating replication operations comprises creating at least one replication operation to delete a row from at least one of the one or more target storages.

7. The media of claim 1, wherein the performing batch execution of the replication operations comprises:
obtaining a second eTag for each of the obtained rows of the one or more target storages, the second eTag comprising the identifier for the specific version of each of the obtained rows;
comparing the first eTag and second eTag of each obtained row; and
when the first eTag and second eTag of an obtained row are different:
replacing the winning row with the row with differing first eTag and second eTag as a new winning row, the new winning row representing a later version of the row than the winning row; and
performing the replication operations on the obtained rows of the one or more target storages using the new winning row.

8. The media of claim 1, wherein the replication message comprises instructions to replicate data to one or more table rows of the source tables in the replication group, wherein the instructions include unique row identifiers for each table row.

9. The media of claim 1, the method further comprising when the replication operations are successfully performed at the target storages within the replication group, dequeuing the replication message from the message queue.

10. The media of claim 1, the method further comprising when at least one operation of the replication operations is unsuccessful, requeuing the replication message to the message queue.

11. A computer-implemented method of processing replication messages in distributed storage, the method comprising:
receiving a replication message from a message queue associated with a first table among a plurality of tables, at least two tables of the plurality of tables being located at different locations;
obtaining a row identifier identifying a row to be updated from the replication message;
fetching a row from each of the plurality of tables corresponding to the row identifier, the fetching comprising for each table:
determining if a matching row corresponding to the row identifier exists in the table; and
when a matching row exists in the table, returning the matching row and a first entity tag (eTag) corresponding to the matching row, wherein an eTag comprises an identifier for a specific version of the row;
determining whether at least one fetched row from the plurality of tables has a later timestamp than the identified row from the first table;

determining a winning row based on a latest timestamp of the fetched row from each of the plurality of tables, the winning row being the fetched row with the latest timestamp; and replicating the winning row among the plurality of tables.

12. The method of claim 11, wherein when a fetched row from a table of the plurality of tables is a placeholder row, the replicating the winning row comprises creating an insert operation for the table corresponding to the winning row.

13. The method of claim 11, further comprising:
determining that the winning row is marked for deletion, wherein when the winning row is marked for deletion, the replicating the winning row comprises creating a delete operation for the fetched row from each of the plurality of tables.

14. The method of claim 11, wherein the replicating the winning row comprises creating a replace operation for the fetched row from each of the plurality of tables with the winning row, wherein the first eTag is retained.

15. The method of claim 11, wherein the replicating the winning row comprises:
obtaining a second eTag for the each of the fetched rows of the plurality of tables, the second eTag representing a state of the fetched row at the time the second eTag was generated;
comparing the first eTag and second eTag;
when the first eTag and second eTag are different, replacing the winning row with the fetched row with different first and second eTags;
replicating the fetched row with different first and second eTags among the plurality of tables.

16. A computer-implemented system comprising:
one or more processors; and
one or more computer-storage media storing computer-useable instructions that, when executed by the one or more processors, cause the one or more processors to perform a method comprising:
receiving a replication message from a message queue associated with a first table among a plurality of tables, at least two tables of the plurality of tables being located at different locations;
obtaining a row identifier identifying a row to be updated from the replication message;
fetching a row from each of the plurality of tables corresponding to the row identifier, the fetching comprising for each table:
determining if a matching row corresponding to the row identifier exists in the table; and
when a matching row exists in the table, returning the matching row and a first entity tag (eTag) corresponding to the matching row, wherein an eTag comprises an identifier for a specific version of the row;
determining whether at least one fetched row from the plurality of tables has a later timestamp than the identified row from the first table;
determining a winning row based on a latest timestamp of the fetched row from each of the plurality of tables, the winning row being the fetched row with the latest timestamp; and
replicating the winning row among the plurality of tables.

17. The system of claim 16, wherein when a fetched row from a table of the plurality of tables is a placeholder row, the replicating the winning row comprises creating an insert operation for the table corresponding to the winning row.

18. The system of claim 16, wherein the method further comprises:
determining that the winning row is marked for deletion, wherein when the winning row is marked for deletion, the replicating the winning row comprises creating a delete operation for the fetched row from each of the plurality of tables.

19. The system of claim 16, wherein the replicating the winning row comprises creating a replace operation for the fetched row from each of the plurality of tables with the winning row, wherein the first eTag is retained.

20. The system of claim 16, wherein the replicating the winning row comprises:
obtaining a second eTag for the each of the fetched rows of the plurality of tables, the second eTag representing a state of the fetched row at the time the second eTag was generated;
comparing the first eTag and second eTag;
when the first eTag and second eTag are different, replacing the winning row with the fetched row with different first and second eTags;
replicating the fetched row with different first and second eTags among the plurality of tables.

* * * * *